US008888999B2

(12) United States Patent
Van der Meijden

(10) Patent No.: US 8,888,999 B2
(45) Date of Patent: Nov. 18, 2014

(54) DEBRIS FILTER

(75) Inventor: Hendrikus Johannes Van der Meijden, Midrand (ZA)

(73) Assignee: Zodiac Pool Systems, Inc., Vista, CA (US)

( * ) Notice: Subject to any disclaimer, the term of this patent is extended or adjusted under 35 U.S.C. 154(b) by 618 days.

(21) Appl. No.: 13/253,117

(22) Filed: Oct. 5, 2011

(65) Prior Publication Data

US 2012/0097589 A1    Apr. 26, 2012

Related U.S. Application Data

(60) Provisional application No. 61/406,630, filed on Oct. 26, 2010.

(30) Foreign Application Priority Data

Nov. 26, 2010   (FR) ...................................... 10 04604

(51) Int. Cl.
| | | |
|---|---|---|
| *C02F 1/38* | (2006.01) | |
| *B04C 5/04* | (2006.01) | |
| *B04C 5/103* | (2006.01) | |
| *B04C 5/13* | (2006.01) | |
| *C02F 103/42* | (2006.01) | |

(52) U.S. Cl.
CPC . *B04C 5/04* (2013.01); *B04C 5/103* (2013.01); *B04C 5/13* (2013.01); *C02F 1/38* (2013.01); *C02F 2103/42* (2013.01)
USPC ................ 210/167.1; 210/167.12; 210/512.1; 210/788

(58) Field of Classification Search
CPC ............ B04C 5/13; B04C 5/04; B04C 5/103; C02F 2103/42; C02F 1/38

USPC .............. 210/167.1, 167.15, 417.2, 440, 443, 210/444, 512.1, 416.2, 167.12, 787, 788
See application file for complete search history.

(56) References Cited

U.S. PATENT DOCUMENTS

| | | | |
|---|---|---|---|
| 2,918,139 A | 12/1959 | Silverman | |
| 5,269,913 A | 12/1993 | Atkins | |
| 5,554,277 A * | 9/1996 | Rief et al. ........................ | 210/94 |
| 6,200,487 B1 * | 3/2001 | Denkewicz et al. ........... | 210/749 |
| 6,488,848 B1 * | 12/2002 | Smith ............................ | 210/301 |
| 6,531,066 B1 * | 3/2003 | Saunders et al. .............. | 210/787 |
| 2010/0213118 A1 | 8/2010 | Tandon | |

FOREIGN PATENT DOCUMENTS

| | | |
|---|---|---|
| EP | 0972573 | 1/2000 |
| WO | 03030702 | 4/2003 |
| WO | 2012057974 | 5/2012 |

OTHER PUBLICATIONS

International Search Report and Written Opinion dated Jan. 19, 2012 in Application No. PCT/US2011/054838.
International Preliminary Report on Patentability dated May 10, 2013 in Application No. PCT/US2011/054838.

* cited by examiner

*Primary Examiner* — Fred Prince
(74) *Attorney, Agent, or Firm* — Dean W. Russell; Kilpatrick Townsend & Stockton LLP

(57) ABSTRACT

Filters and methods of filtering debris from fluid are detailed. A vortex of debris-laden fluid may be created within a filter, causing certain debris (including, for example, leaves) to settle therein. Some versions of the filters may include two stages, one having a perforated tube and a second having a generally frustoconically-shaped tube, which may or may not be perforated.

18 Claims, 4 Drawing Sheets

DEBRIS FILTER

CROSS-REFERENCE TO RELATED APPLICATIONS

This application claims the benefit of and priority to both U.S. Provisional Patent Application Ser. No. 61/406,630, filed Oct. 26, 2010, and French Patent Application No. 10/04604, filed Nov. 26, 2010, the entire contents of both of which are hereby incorporated by this reference.

FIELD OF THE INVENTION

This invention relates to particulate filters and more particularly, although not exclusively, to filters of leaves and other debris frequently encountered during cleaning of swimming pools and spas.

BACKGROUND OF THE INVENTION

U.S. Pat. No. 5,269,913 to Atkins details exemplary debris traps for use with automatic swimming pool cleaners ("APCs"). Depicted in the Atkins patent is a generally cylindrical filter suspended within a housing. Attached to the housing may be a lid having a conduit with an inlet and an outlet and, at its midpoint, a downspout extending perpendicularly therefrom. The downspout prevents direct fluid flow through the conduit but is open to the inlet, penetrates the filter, and terminates in an open end within the filter. As noted in the Atkins patent:

> Water and debris entering the inlet are directed downward into the interior of the filter by the perpendicular tube. The water then filters outward through the filter and migrates to the outlet along the open space between the filter and the housing, trapping the debris within the filter where the heavier debris settles to the bottom of the housing rather than collecting on the filter.

See Atkins, col. 2, ll. 32-39.

U.S. Patent Application Publication No. 2010/0213118 of Tandon describes a sediment filter intended to eliminate "need for frequent back flushing of swimming pool sand filters." See Tandon, p. 2, ¶ 0023. According to the Tandon application, the filter includes multiple cyclones as well as > a sediment bowl with a hemispherical bottom and a sump therein for collecting sediment, a cylindrical cyclone housing disposed above and sealingly connected to the sediment bowl, a removable and replaceable cyclone cartridge inserted into the cyclone housing, a diffuser plate sealingly connected to the cyclone cartridge and cyclone housing, a fluid inlet for introducing fluid into the cyclone housing, and a fluid outlet for discharging fluid from the cyclone housing.

See Tandon, p. 2, ¶ 0018. "As sediment is removed from the fluid in each cyclone, it is separated out and delivered down into the sediment bowl sump, while the fluid is directed upwardly and out to the fluid outlet." See id., Abstract.

Filters of the Tandon application are designed to connect to outlets of fluid pumps and remove (i.e. pre-filter) fine particulates from water exiting a pump before the water enters a standard pool filter. As configured, the filters would not operate to separate leaves or other large debris from the water. Such would be true even if the (small) cyclones were scaled, although no suggestion of such scaling exists in the Tandon application.

SUMMARY OF THE INVENTION

The present invention provides alternate filters and methods of filtering debris from fluid. Designed principally (although not necessarily exclusively) to be connected to an inlet of a fluid pump, the invention allows separation of debris from fluid flowing to the pump. Further, debris separation may occur outside the primary fluid flow path.

The invention is especially useful as part of a system for cleaning circulating water of a swimming pool or spa. Leaves, in particular, present significant problems for existing cleaning systems, as their relatively large surface areas, relatively light dry weights, and saturated specific gravities similar to that of water make them difficult to separate from the water without degrading performance of the system. Indeed, conventional cyclonic filters would perform poorly in filtering leaves entrained in water, as the attraction force to the primary flow due to their large surface areas will exceed that of the centrifugal force generated, precluding their separation from the water.

Unlike conventional such filters, that of the present invention successfully separates leaves (and other debris) from water or other fluid. Certain versions may include a first stage adjacent an inlet and outlet and a second stage remote from the inlet and outlet. A disc or other object preferably (although not necessarily) separates an inner core comprising the first and second stages, with the disc (when present) functioning to inhibit debris from migrating from the second stage back toward the inlet or outlet.

Beneficially included in the first stage is a perforated first tube of generally cylindrical shape. Although the first tube preferably is generally cylindrical, use of the term "tube" herein is not necessarily intended to imply any cylindrical structure. Indeed, by contrast, a second tube of generally frustoconical shape may be included in the second stage. The second tube may, but need not necessarily, also be perforated. Because the first tube is perforated, its interior region may continue to form part of the primary fluid flow path and thus may be directly connected to the outlet.

Filters consistent with the present invention also may include housings and position the inlet and outlet in lids attachable to (and desirably decouplable from) the housings. Surrounding at least part of the first tube within a housing may be a director advantageously being generally cylindrical in shape. At least some fluid entering the housing via the inlet initially may be restricted to an annular region between the interior of the director and the exterior of the first tube. Preferably, however, the director terminates a distance from the disc, allowing that fluid to pass by the disc into the second stage.

In use of the filters, fluid (such as debris-laden water) may enter via an inlet, with the inlet imparting a spinning, spiral motion to the fluid (i.e. creating a vortex) in the annular region between the director and the first tube. Some fluid will enter the interior region of the first tube through its perforations and transit to the outlet, while the remainder of the fluid, laden with debris, will continue to spin in the annular region. Angling perforations of the first tube in a direction opposite the spiral flow therearound will assist in preventing debris from entering its interior region.

When the debris-laden fluid reaches a terminating edge of the director, it travels (under centrifugal force, applicants currently believe) outward to (or toward) the interior surface of the housing, traveling beyond the disc into the second stage. In this second stage, the fluid spins more slowly, allowing debris to settle therein. Assuming the filter is oriented vertically, gravity as well may assist in settling debris in the second stage, as the second stage will be below the first stage.

Alternatively, the second stage may contain a second tube of non-frustoconical (e.g. cylindrical) shape or omit any second tube entirety. Indeed, in some versions of the invention, the second stage may simply comprise a sump or other area capable of receiving debris. As well, the second stage may be detachable from the first stage.

Because perforations comprise a substantial amount of the overall surface area of the first tube, the primary fluid flow provides relatively low attractive force to leaves present in the annular region. Accordingly, forces associated with the spinning motion are able to overcome the attractive forces and cause leaves to continue (or resume) their spiral motion through the first stage toward the second stage. Forming the first tube of low-friction material may also be beneficial in overcoming the attractive forces.

It thus is an optional, non-exclusive object of the present invention to provide filters and methods of filtering fluids.

It is also an optional, non-exclusive object of the present invention to provide filters principally for use in separating debris from water of swimming pools and spas.

It is another optional, non-exclusive object of the present invention to provide filters in fluid communication with inlets of pumps.

It is a further optional, non-exclusive object of the present invention to provide filters in which debris may be separated from fluid in a region outside the primary fluid flow path.

It is an additional optional, non-exclusive object of the present invention to provide two-stage debris filters, with a first stage including a perforated tube and a second stage including a frustoconically-shaped tube.

It is, moreover, an optional, non-exclusive object of the present invention to provide a filter whose perforated tube defines an interior region forming part of the primary fluid flow path and that is in fluid communication with an outlet.

It is yet another optional, non-exclusive object of the present invention to provide filters configured to impart spinning, spiral motion to entering fluid, with such motion (together with gravity in certain circumstances) overcoming, at least for some leaves, forces tending to attract the leaves to the perforated tube.

Other objects, features, and advantages of the present invention will be apparent to those skilled in appropriate fields with reference to the remaining text and drawings of this application.

DETAILED DESCRIPTION

Figure 1:
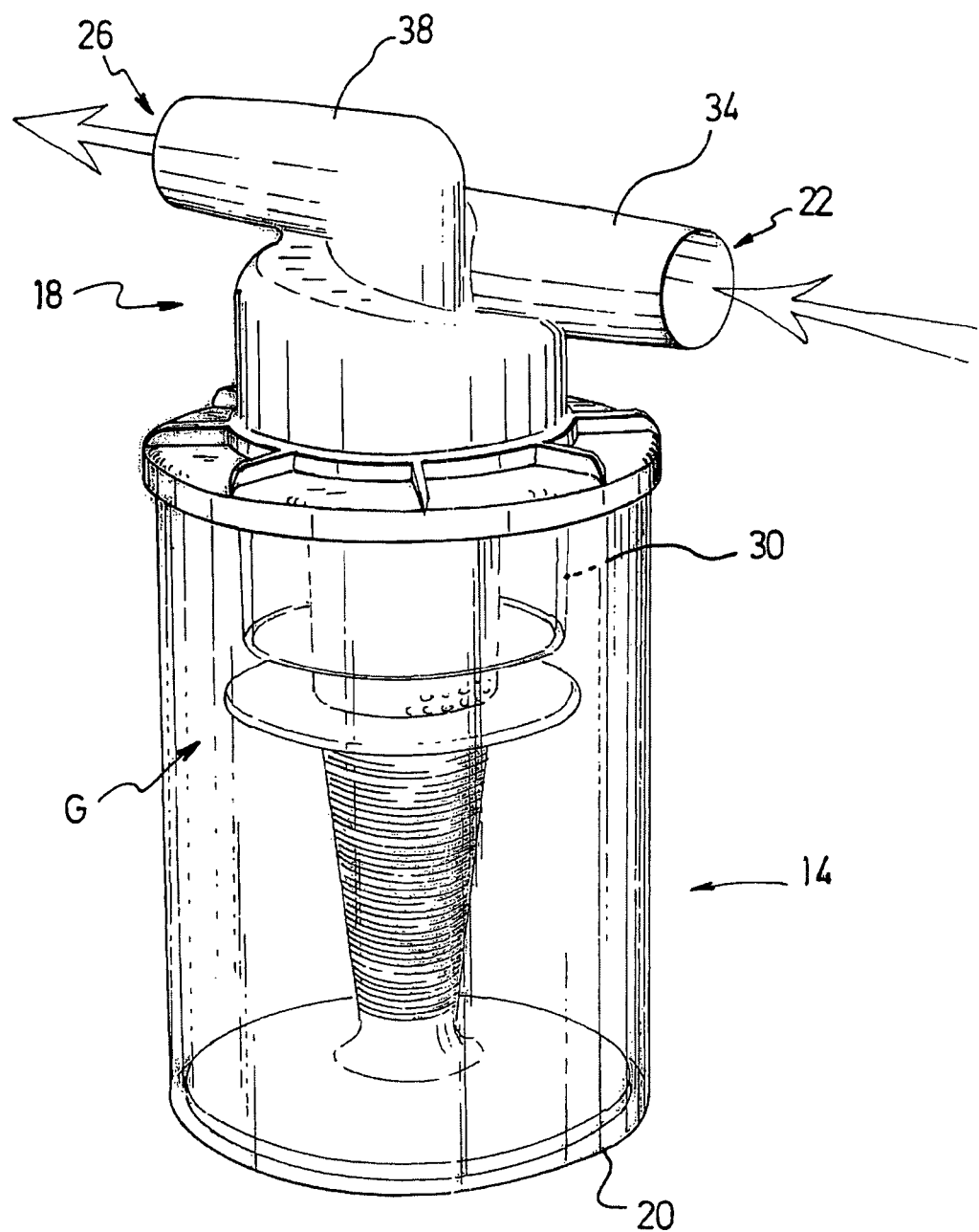
FIG. 1 is a perspective view of an exemplary filter of the present invention.
Figure 2:
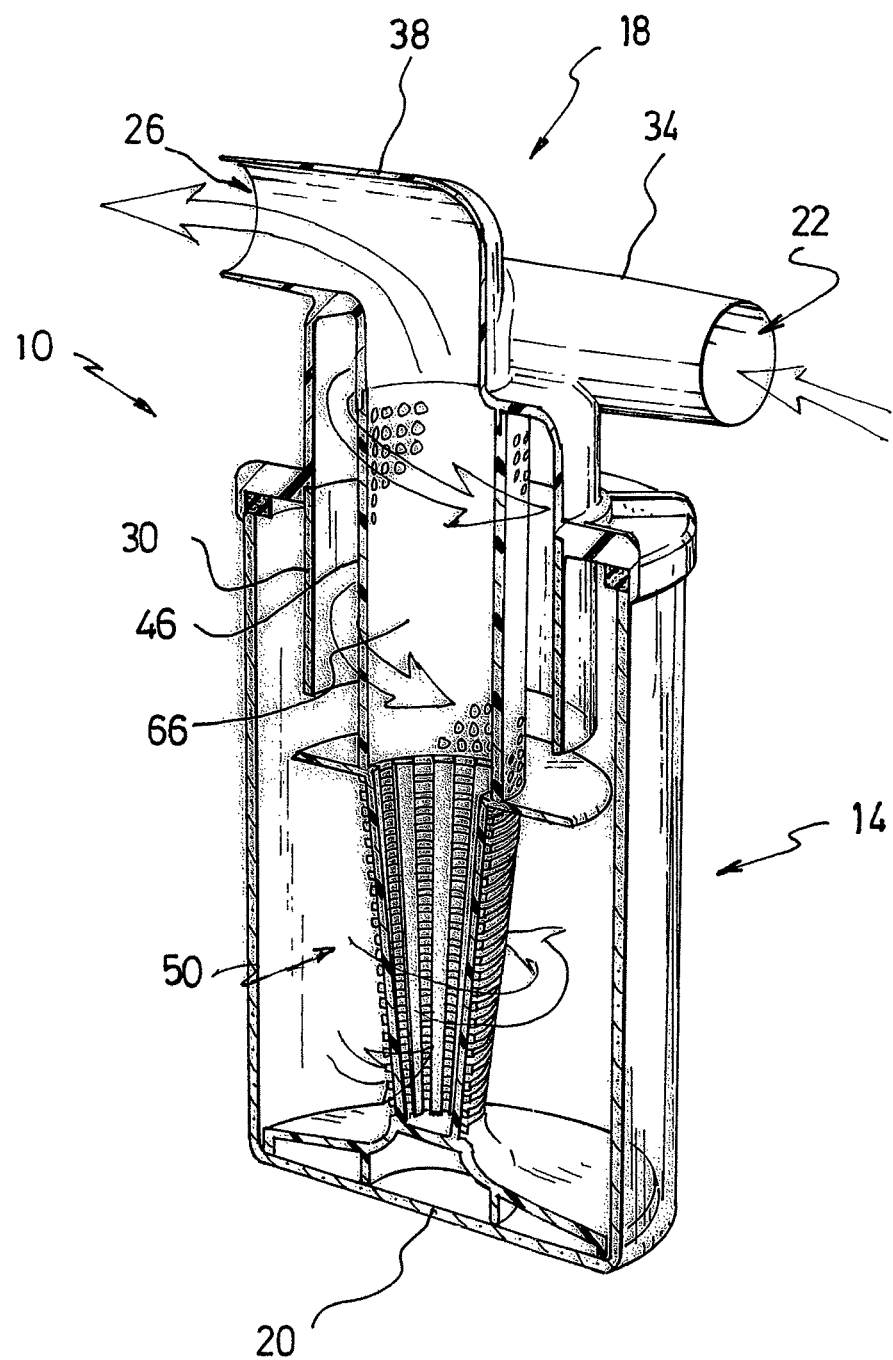
FIG. 2 is a cut-away view of the filter of FIG. 1.

Depicted in FIGS. 1-2 is an example of a filter 10 consistent with the present invention. Filter 10 may include housing 14 to which lid 18 may be attached. Such attachment may be permanent; alternatively (and preferably), lid 18 may be removable from housing 14. However, when housing 14 and lid 18 are attached, the attachment should be fluid-tight (or nearly so) to avoid creating a leakage path into or from the housing 14. Housing 14 may include floor 20 and may be generally cylindrical in shape, although other shapes may be utilized instead.

Lid 18 may comprise inlet 22, outlet 26, and director 30. (Alternatively, director 30 may be part of housing 14 or otherwise not be part of lid 18.) Inlet 22 is defined by termination of inlet conduit 34, whereas outlet 26 is defined by termination of outlet conduit 38. Inlet conduit 34 is configured to impart spinning, spiral motion (downward as filter 10 is oriented in FIGS. 1-2) to fluid entering filter 10 via inlet 22.

Figure 3:
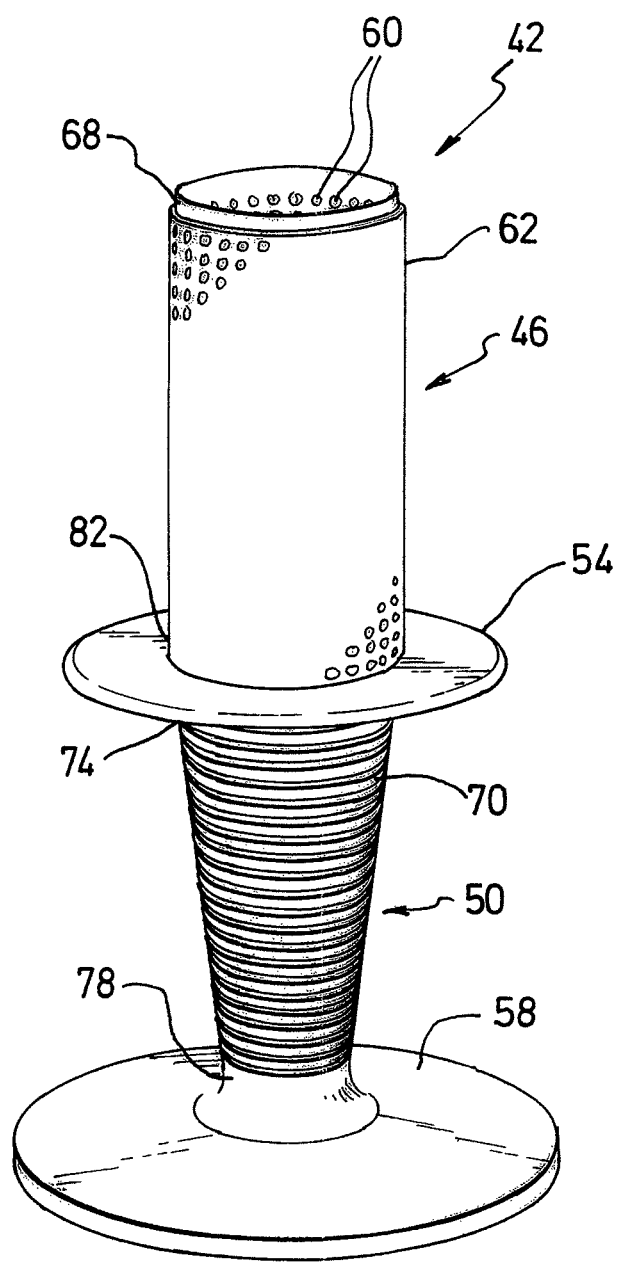
FIG. 3 is a perspective view of an exemplary inner core of the filter of FIG. 1.

Positioned within housing 14 may be central, inner core 42 of filter 10. As illustrated in FIGS. 1-3, core 42 comprises first tube 46, second tube 50, disc 54, and base 58. These components may be integrally formed (as is shown in FIG. 3); alternatively, they may be connected in any suitable manner. Because filter 10 preferably is oriented upright when in use, first tube 46 typically will be above second tube 50. Filter 10 conceivably may be oriented otherwise than upright at times, however. Core 42 preferably is removable from within housing 14 to facilitate, among other things, removal of accumulated debris. Indeed, at least some versions of inner core 42 may include a pliable wiper or similar component attached to the periphery of base 58 so as to wipe ("squeegee") debris from the interior of the wall of housing 14 as the core 42 is removed.

As depicted, first tube 46 is generally cylindrical, whereas second tube 50 is generally conical (or, preferably, frustoconical) in shape. First tube 46 additionally includes multiple perforations in the form of openings 60, allowing fluid to flow from its exterior 62 to its interior region 66. Interior region 66 additionally is connected to outlet conduit 38 at a nominally upper end 68 of first tube 46 so as to allow fluid within region 66 to travel via the conduit 38 to outlet 26. Inlet conduit 34, interior region 66, and outlet conduit 38 thus may form most or all of a primary fluid flow path through filter 10.

Figure 4:
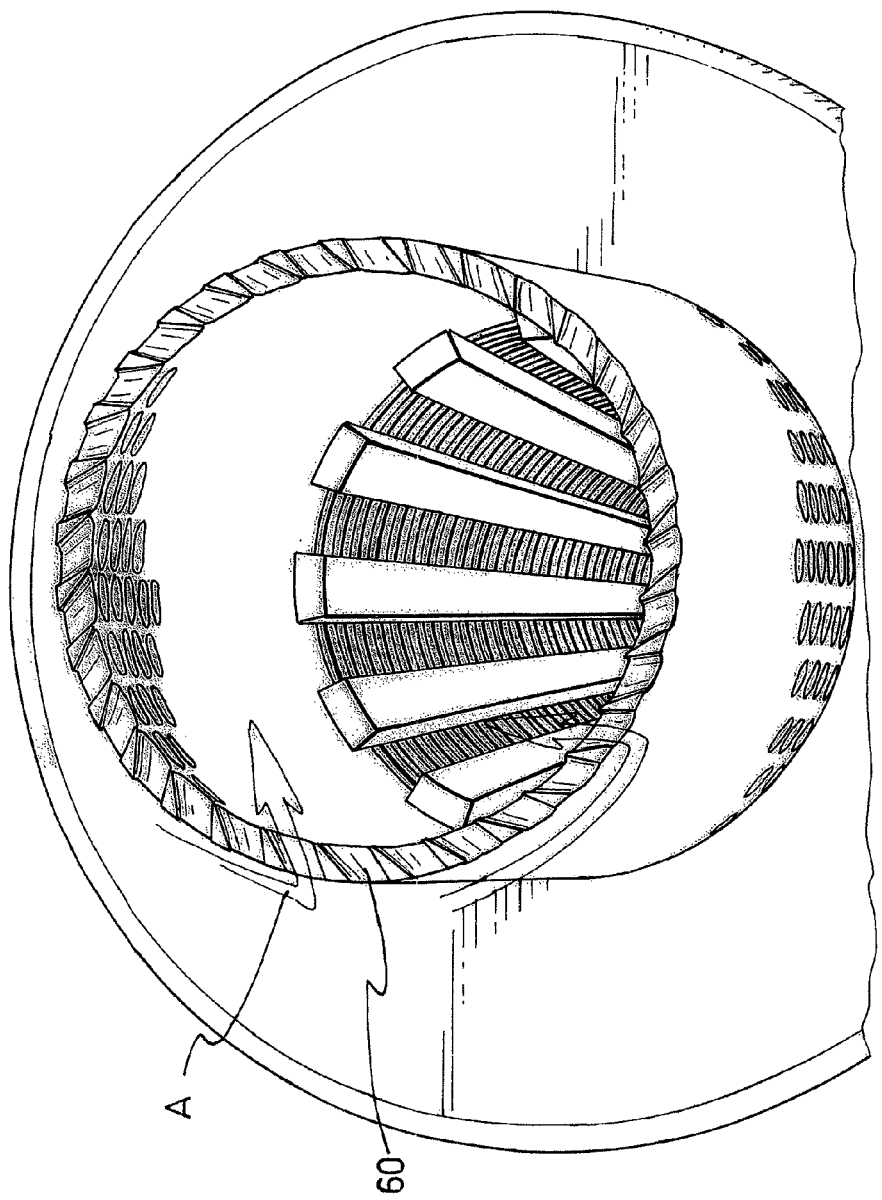
FIG. 4 is a cut-away, generally top or bottom view of a portion of a first tube of the inner core of FIG. 3.

Openings 60 may be formed in first tube 46 in any appropriate way. The openings 60 additionally may be of any number, size, or shape adequate to achieve any object of the invention. Preferably, though, openings 60 comprise a significant portion of the surface area of exterior 62 so as to not provide too great a resistance to fluid flow. Further, as shown in FIG. 4, openings 60 may be angled such that spinning, debris-laden fluid must transit an acute angle A from exterior 62 to interior region 66, discouraging debris from passing through the openings 60.

Second tube 50 preferably, but not necessarily, is perforated. Regardless, it defines an exterior 70 whose diameter decreases from its nominally upper end 74 to its nominally lower end 78. Upper end 74 may be adjacent lower end 82 of first tube 46, whereas lower end 78 may be adjacent base 58, which in turn may be adjacent floor 20 in use. The maximum diameter of second tube 50, furthermore, preferably is approximately the same as, or less than, the diameter of first tube 46.

Positioned between or adjacent upper end 74 and lower end 82 may be disc 54. Disc 54 thus effectively divides filter 10 into two stages, a first stage above the disc 54 and a second stage below the disc 54 (in the orientation of FIGS. 1-3). Disc 54 preferably has—but need not necessarily have—cross-sectional shape similar to that of housing 14. If disc 54 is annular or circular, however, it should have smaller diameter than the diameter of housing 14 so that fluid may flow from the first stage to the second stage through an (annular) gap G.

At least some versions of filter 10 may be connected, through suitable hoses or conduits, between a pump and a "suction-side" APC. When the APC is placed within a swimming pool and the pump is activated, both filter 10 and the APC are at least partially evacuated. This action in turn causes debris-laden water to flow into and through the APC and then through a hose or conduit to inlet 22. Some of the water will travel through filter 10 in the primary flow path described above and exit via outlet 26 for continued travel toward the pump.

The remainder of the debris-laden water entering inlet 22 will continue to spin downward between director 30 and exterior 62 of the first stage of filter 10, with centrifugal force (and, if applicable, gravity) eventually forcing the water through gap G to the second stage. Because these forces are intended to be larger than the force attracting larger debris (e.g. leaves) onto openings 60, the larger debris effectively may be "torn" or "ripped" from the openings 60 for conveyance through gap G. Continuous in-flow of water into inlet 22 aids in creating the vortex, moving the debris around second tube 50 toward base 58. However, because of the decreasing diameter of second tube 50 and its increasing distance from the suction force applied by the pump to outlet 26, the water in the second stage spins more slowly, operating to "wind" debris around exterior 70 of second tube 50, compressing the volume of debris and thus allowing longer use of filter 10 prior to removing accumulated debris therefrom. The arrangement of forces and size of disc 54 additionally inhibit debris from returning through gap G back into the first stage.

In a general sense, therefore, filter 10 strains leaves in water rather than, for example, particles in air. Filter 10 does not necessarily centrifugally "spin out" particles for collection in a sheltered part of housing 14, unlike analogous structures of cyclonic air vacuum cleaners. Instead in filter 10 a high-velocity rush of water is created past a portion of a strainer (e.g. first tube 46), an aim of which is to "tear off" leaves from the water, keeping the water void of leafy debris so it may pass through openings 60 generally unrestricted.

Leafy debris, and most other light-weight pool debris, is naturally attracted to exterior 62 of first tube 46, even though some centrifugal force is present. Centrifugal force of this nature does not separate light debris in water, however, nor does it keep leafy debris away from the strainer. Indeed, applicants submit that one is not able to separate this type of debris from water centrifugally.

Rather, in filter 10 the debris is not afforded the chance to adhere to the upper portion of the strainer (e.g. to first tube 46), as in that narrow portion the cyclone maintains a speed of water, the force of which is greater than the force of the draw through the strainer. The high speed water therefore "cleans" the narrow upper portion of the strainer. The wider, lower portion of the strainer (e.g. second tube 50), in contrast to the former, is designed to slow this cyclone in this area. This slowing in turn encourages the light, leafy debris to attach and wrap around the lower portion of the strainer. In this region the force of the draw through the strainer is greater than the force of the cyclonic water and the reverse happens—the leafy debris is collected away from the upper portion of strainer, an area desirably kept "clean."

An aim of filter 10, therefore, is to create a high-speed velocity stream of water past a portion of strainer and then a low-speed velocity stream of water for collection. This approach also may work linearly, but for convenience and compactness using a generally cylindrical housing 14 is presently preferred. Both first tube 42 and second tube 46 strain water thence flowing to outlet 26, resulting in more efficient straining (as opposed to more efficient cyclonic action, as desired in conventional air cyclone vacuum cleaners). Further unlike air cyclone vacuums, filter 10 preferably contains no "dead zone" or low-flow sump within housing 14.

The foregoing is provided for purposes of illustrating, explaining, and describing embodiments of the present invention. Modifications and adaptations to these embodiments will be apparent to those skilled in the art and may be made without departing from the scope or spirit of the invention. Additionally, the contents of the Atkins patent and Tandon application are incorporated herein in their entireties by this reference.

What is claimed is:

1. Apparatus for filtering leafy debris entrained in flowing water of a pool or spa, the apparatus comprising:
   a. an inlet;
   b. a first tube (i) defining (A) a first exterior, (B) a first interior region, and (C) a first maximum diameter and (ii) comprising first openings through which water may flow from the first exterior to the first interior region;
   c. a second tube (i) defining (A) a second exterior around which water that flowed through the inlet but not through the first openings may flow, (B) a second interior region, and (C) at least one cross-sectional diameter less than the first maximum diameter and (ii) comprising; second openings through which water may flow from the second exterior to the second interior region;
   d. an outlet in liquid communication with both the first and second interior regions; and
   e. means for imparting spinning motion to water flowing through the inlet and around the first exterior.

2. Apparatus according to claim 1 further comprising a housing containing at least the second tube, the housing having an interior and defining a region between its interior and the second exterior in which leafy debris may accumulate for removal.

3. Apparatus according to claim 2 further comprising a lid attaching to the housing and comprising the inlet and the outlet.

4. Apparatus according to claim 3 in which the housing defines a width, further comprising a disc (i) positioned between the first and second tubes, (ii) defining a periphery, and (iii) having a size less than the width of the housing so as to create a gap between the periphery and the interior of the housing.

5. Apparatus according to claim 4 in which the disc is annular and the housing is generally cylindrical.

6. Apparatus according to claim 5 further comprising a base attached to the second tube.

7. Apparatus according to claim 1 in which the first openings are angled such that water must transit an acute angle from the first exterior to the first interior region.

8. Apparatus according to claim 1 in which the inlet is connected to an automatic pool cleaner and the outlet is connected to a pump.

9. Apparatus for filtering leafy debris entrained in flowing water of a pool or spa, the apparatus comprising:
   a. an inlet;
   b. a first tube (i) defining (A) an exterior and (B) an interior region and (ii) comprising openings through which water may flow from the exterior to the interior region;
   c. an outlet in liquid communication with the interior region;
   d. means for imparting spinning motion to water flowing through the inlet and around the exterior of the first tube;
   e. a second tube;
   f. a housing containing at least the second tube and having an interior;
   g. a base defining a periphery; and
   h. a pliable wiper attached to the base about its periphery and abutting the interior of the housing.

10. Apparatus according to claim 9 in which the housing has a floor and the base is configured for positioning adjacent the floor.

11. Apparatus according to claim 10 in which the first and second tubes and the base are removable from the housing as a unit.

12. Apparatus according to claim 11 in which the first and second tubes and the base are integrally formed.

13. Apparatus according to claim 12 in which the second tube is frustoconically shaped.

14. Apparatus according to claim 13 in which the first tube is generally cylindrically shaped.

15. Apparatus according to claim 14 in which the second tube is positioned below the first tube when the apparatus is upright.

16. Apparatus according to claim 15 in which the motion-imparting means comprises an inlet conduit configured to impact spiraling motion downward when the apparatus is upright.

17. Apparatus according to claim 16 further comprising a director configured such that water may spin downward between it and the exterior of the first tube.

18. A method of filtering leafy debris entrained in flowing water, comprising:
   a. introducing debris-laden water into a filter;
   b. imparting spinning motion to the water;
   c. causing a first portion of the water to pass from the exterior to the interior region of a first tube having a first maximum diameter and thence to an outlet of the filter;
   d. straining leafy debris from the first portion of the water as it passes from the exterior to the interior region of the first tube; and
   e. causing a second portion of the water to (i) spin downward outside the exterior of the first tube, (ii) spin around a second tube having at least one cross-sectional diameter less than the first maximum diameter, and (iii) pass from the exterior to the interior of the second tube and thence to the outlet of the filter.

\* \* \* \* \*